US010466125B2

(12) United States Patent
Wagner (10) Patent No.: US 10,466,125 B2
(45) Date of Patent: Nov. 5, 2019

(54) PRESSURE SENSOR SUB ASSEMBLY AND FABRICATION

(71) Applicant: Measurement Specialties, Inc., Hampton, VA (US)

(72) Inventor: David E. Wagner, Los Gatos, CA (US)

(73) Assignee: Measurement Specialties Inc., Hampton, VA (US)

( * ) Notice: Subject to any disclaimer, the term of this patent is extended or adjusted under 35 U.S.C. 154(b) by 193 days.

(21) Appl. No.: 15/349,699

(22) Filed: Nov. 11, 2016

(65) Prior Publication Data

US 2018/0136063 A1    May 17, 2018

(51) Int. Cl.
*G01L 9/00* (2006.01)
*G01L 13/02* (2006.01)

(52) U.S. Cl.
CPC .......... *G01L 9/0055* (2013.01); *G01L 9/0042* (2013.01); *G01L 13/026* (2013.01)

(58) Field of Classification Search
None
See application file for complete search history.

(56) References Cited

U.S. PATENT DOCUMENTS

| | | | | |
|---|---|---|---|---|
| 5,184,107 A | * | 2/1993 | Maurer | G01L 19/0084 29/621.1 |
| 5,186,055 A | * | 2/1993 | Kovacich | G01L 9/0055 29/621.1 |
| 5,684,253 A | * | 11/1997 | Bonne | G01L 19/0038 73/706 |
| 6,023,978 A | | 2/2000 | Dauenhauer et al. | |
| 6,255,728 B1 | * | 7/2001 | Nasiri | G01L 19/0038 257/666 |
| 6,311,561 B1 | | 11/2001 | Bang et al. | |
| 6,543,291 B1 | * | 4/2003 | Kurtz | G01L 13/025 73/716 |
| 8,230,743 B2 | * | 7/2012 | Wade | G01L 9/0052 73/706 |

(Continued)

FOREIGN PATENT DOCUMENTS

| | | |
|---|---|---|
| EP | 1782029 A1 | 5/2007 |
| EP | 2189773 A2 | 5/2010 |
| EP | 3048434 A2 | 7/2016 |

OTHER PUBLICATIONS

International Search Report and Written Opinion of the International Searching Authority, issued in related PCT/EP2017/078957, dated Apr. 30, 2018.

*Primary Examiner* — Peter J Macchiarolo
*Assistant Examiner* — Jermaine L Jenkins
(74) *Attorney, Agent, or Firm* — Howard IP Law Group (57) ABSTRACT

A differential pressure sensor includes a first sensor housing member having a first fluid inlet port for receiving a first fluid at a first pressure and a second sensor housing member having a second fluid inlet port for receiving a second fluid at a second pressure. A pressure-sensing subassembly includes a semiconductor pressure-sensing die having a sensitive diaphragm for sensing pressure. The pressure-sensing subassembly is configured for insertion into the differential pressure sensor such that once inserted the first fluid inlet port is in fluid communication with a first surface of the sensitive diaphragm and the second fluid inlet port is in fluid communication with a second surface of the sensitive diaphragm.

20 Claims, 7 Drawing Sheets

(56) References Cited

U.S. PATENT DOCUMENTS 9,310,267 B2 * 4/2016 Wagner .................... G01F 1/34
9,593,995 B2 3/2017 Wagner et al.
9,638,597 B2 * 5/2017 Hooper ................ G01L 9/0052

* cited by examiner

PRESSURE SENSOR SUB ASSEMBLY AND FABRICATION

FIELD OF THE INVENTION

This application relates to sensors. More particularly, the application relates to semiconductor pressure sensors.

BACKGROUND OF THE INVENTION

Differential pressure sensors measure a difference in pressure between two isolated fluids or gasses. When used in an environment which includes conductive or corrosive gasses or fluids, the sensor must be isolated from these harsh media in order to protect the sensor itself, as well as the electronic or electrical components attached thereto. Differential pressure sensors are harder to isolate from harsh media than gage or absolute pressure sensors due to the presence of two pressure sources being applied to opposing sides of the sensor. Therefore, both sides of the sensor must be isolated in some way or the sensor may be damaged.

A differential pressure sensor (or transducer) converts a difference in pressure to an electrical signal that can be measured to determine the differential pressure value. A pressure-sensing device of the sensor is typically manufactured using micro-machined or Micro-Electro-Mechanical System (MEMS) type methods. This technology is used to manufacture commercial semiconductors along with etching and bonding techniques to fabricate very small, inexpensive devices that convert differential pressure to an electrical signal. The materials used in these devices do not resist corrosion as well as other well-known corrosive resistant metals such as stainless steel, titanium, copper and brass, which are typically used in corrosive fluid and gas plumbing. For this reason, an isolation method is required to act as a barrier for corrosion but allow pressure to be communicated to the pressure-sensing device without substantially degrading a generated signal.

The pressure-sensing die is formed from a semiconductor material such as silicon. The die is formed from a silicon wafer by methods such as dicing to produce a silicon structure, which is thinned to create a cavity and define an associated diaphragm. Piezoresistive elements are formed or placed at the surface of the diaphragm and are configured to exhibit resistance that is proportional to the strain placed on the thinned semiconductor material forming the diaphragm.

Differential pressure sensors may be used to measure pressure relating to harsh media, for example, petroleum fluids, acids, and the like. The semiconductor surfaces of the pressure-sensing die, which support the piezoresistive elements and their associated electrical connections, may be damaged or their lives shortened by exposure to harsh media. To allow use of semiconductor pressure-sensing dies in harsh environments, the pressure-sensing die may be inserted in a package which protects the pressure-sensing die from the media whose pressure is being measured.

A suitable package may include one or more input ports for receiving the media whose pressure is to be measured. The media being measured enters a first volume of the package which is isolated from the pressure-sensing die by a flexible membrane or diaphragm. The flexible membrane or diaphragm is formed from a material which can withstand any harsh effects related to the media whose pressure is being measured. For example, the flexible membrane or diaphragm that contacts the measured media may comprise stainless steel. The flexible membrane or diaphragm is configured to flex when the pressure of the media under test exerts a force to the surface of the flexible membrane or diaphragm.

The package may further define a second volume in contact with the flexible membrane or diaphragm opposite the first volume containing the media under test. The second volume is further in fluid contact with a pressure sensitive surface of the pressure-sensing diaphragm defined in the pressure-sensing die. The second volume is filled with a fluid that may safely contact the diaphragm and associated electrical connections of the pressure-sensing die. For example, the second volume may be filled with silicon oil, which will not harm the semiconductor-based pressure-sensing die. When the media under test is under pressure, it fills the first volume of the package and exerts a force on the flexible membrane, which flexes under the applied force. The flexing of the flexible membrane or diaphragm, in turn, exerts a force against the fluid contained in the second volume. This force, which is representative of the pressure of the media under test, is transferred through the fluid in the second volume to the semiconductor diaphragm of the pressure-sensing die. The applied force causes flexing of the semiconductor diaphragm and the piezoresistive elements formed on the semiconductor diaphragm's surface. The strain on the piezoresistive elements cause their resistance to vary in proportion to the applied force due to the media pressure. An electrical circuit connected to the piezoresistive elements creates an electrical signal, based in part on the resistance value of the piezoresistive elements. Accordingly, the electrical signal is representative of the pressure of the media under test.

Packaging of the pressure-sensing die increases the complexity of manufacturing pressure sensors which may be used in harsh environments. Furthermore, the package may have to be fabricated to adapt to a specific use. Therefore, pressure-sensing dies, along with their associated circuitry, are desired which can be easily fabricated and adapted for installation into a variety of packaging implementations.

SUMMARY

A differential pressure sensor includes a first sensor housing member having a first fluid inlet port for receiving a first fluid at a first pressure and a second sensor housing member having a second fluid inlet port for receiving a second fluid at a second pressure. A pressure-sensing subassembly includes a semiconductor pressure-sensing die having a sensitive diaphragm for sensing pressure. The pressure-sensing subassembly is configured for insertion into the differential pressure sensor such that the first fluid inlet port is in fluid communication with a first surface of the sensitive diaphragm and the second fluid inlet port is in fluid communication with a second surface of the sensitive diaphragm. The pressure-sensing subassembly includes a housing containing the semiconductor pressure-sensing die and a substrate supporting the housing and the semiconductor pressure-sensing die. The housing includes an aperture which allows fluid communication with an upper surface of the sensitive diaphragm, while a second aperture in the substrate allows fluid communication with the lower surface of the sensitive diaphragm. A sealing material is disposed on the outer surface of the housing surrounding the first aperture and on the lower side of the substrate surrounding the second aperture. The sealing material provides a fluid-tight bond between the pressure-sensing subassembly and the pressure sensor package.

DETAILED DESCRIPTION

It is to be understood that the figures and descriptions of the present invention have been simplified to illustrate elements that are relevant for a clear understanding of the present invention, while eliminating, for purposes of clarity, many other elements found in typical sensing systems, such as MEMS-based pressure sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Pressure sensors according to embodiments of the disclosure may measure the pressure of fluids placed in communication therewith. Fluids may be liquid, such as oil or water, or fluids may refer to a gas, such as air or other gasses placed in communication with the sensor via sensing ports. The term fluid when used in this disclosure may refer to either a liquid or a gas or both. Further for the purposes of this disclosure, any state of matter which adapts its shape to the dimensions of its container may also be referred to by the term fluid.

Figure 1:
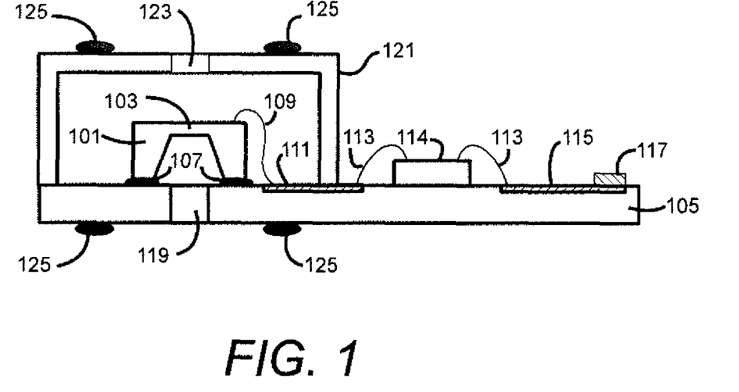
FIG. 1 is a cross-sectional view of a pressure-sensing subassembly according to an embodiment of the disclosure.

FIG. 1 is a cross-sectional view of a pressure sensor subassembly 100 according to an embodiment of this disclosure. Pressure sensor subassembly 100 is configured to detect pressure by way of a semiconductor pressure-sensing die 101. Pressure-sensing die 101 is thinned to form a thinned region defining a diaphragm 103. A surface of diaphragm 103 may be doped to form piezoresistive elements (not shown) which exhibit electrical resistance that varies due to flexing of semiconductor diaphragm 103 when one or more pressures act thereon. Pressure-sensing die 101 may be configured to detect absolute pressure by applying a pressure under test to one surface of semiconductor diaphragm 103 and applying a reference pressure to another surface of semiconductor diaphragm 103 opposite the first surface. Similarly, pressure-sensing die 101 may be configured to detect a differential pressure between a first pressure and a second pressure. This is accomplished by applying the first pressure to a first surface of semiconductor diaphragm 103, while simultaneously applying a second pressure to a second surface of semiconductor diaphragm 103 opposite the first surface. Semiconductor diaphragm 103 will experience a force which is representative of the net pressure difference between the pressures applied to the first and second surfaces or sides of semiconductor diaphragm 103. The piezoresistive elements will exhibit a resistance representative of this net pressure difference applied to semiconductor diaphragm 103. Pressure-sensing die 101 may be attached to a substrate 105 embodied, for example, as a printed circuit board (PCB). Pressure-sensing die 101 is attached (e.g., via adhesive, solder or glass frit) to substrate 105 at attachment points 107, as known in the art. The piezoresistive elements of semiconductor diaphragm 103 are electrically connected to substrate 105 via bond wires 109 or bonded directly to pads formed on substrate 105 to pressure-sensing die 101 using bump or direct solder techniques, as known in the art. According to one embodiment, bond wires 109 are attached to an electrical path or trace 111 which is disposed on or in the surface of substrate 105. In some embodiments electrical path or trace 111 may be a combination of conductors formed on a surface of substrate 105 and conductive layers embedded in substrate 105. Electrically conductive trace 111 may be printed on the surface of substrate 105 using printing or etching techniques, as known in the art.

Pressure sensor subassembly 100 may further include processing circuitry 114 for processing electrical signals generated by the piezoresistive elements of pressure-sensing die 101. Processing circuitry 114 may include a microprocessor in communication with a memory, the microprocessor configured for processing instructions which may be stored in the memory. The memory may be incorporated in a chip along with the microprocessor, or the memory may be separate from the microprocessor and in electrical communication with the microprocessor through circuitry disposed on substrate 105. For example, processing circuitry 114 may be implemented in an application specific integrated circuit (ASIC), a field programmable gate array (FPGA), or other device for processing electrical signals generated by pressure-sensing die 101.

Processing circuit 114 is electrically connect to electrically conductive trace 111 and electrically conductive trace 115, each disposed on substrate 105. Processing circuit 114 may be configured to performed processing on signals produced by pressure-sensing die 101 and to produce processed output signals to an electrical contact pin of bond pad 117, which may be used for facilitating electrical connections to external components for further processing based on the output generated by pressure sensor subassembly 100.

Pressure sensor subassembly 100 may include a housing 121 which defines a volume containing pressure-sensing die 101. Housing 121 may be formed from materials such as silicon or other semiconductor materials, glass, metal, plastic, ceramic as well as other suitable materials. An opening 123 is defined through housing 121 to provide fluid communication to an upper surface of semiconductor diaphragm 103 of pressure-sensing die 101. Opening 123 may comprise a diameter that is about equal to or greater than the diameter or length of semiconductor diaphragm 103. Likewise, a second opening 119 may be defined through substrate 105 to provide fluid communication to the a lower surface of semiconductor diaphragm 103.

Pressure sensor subassembly 100 may include a bonding agent or sealant 125 which is applied to the upper surface of housing 121 for surrounding aperture 123, and to the lower surface of substrate 105 for surrounding aperture 119. According to an alternative embodiment, a seal may be formed at the upper surface of the housing 121 and the underside of substrate 105 using an O-ring seal (126, 128, as shown in FIG. 3B and FIG. 3C). Sealant 125 (or O-ring 126, 128) allows pressure sensor subassembly 100 to be inserted into and sealed with respect to a separately-fabricated sensor housing. Sensor housing 121 may include other pressure sensor components, such as fluid ports associated with apertures 123, 119, oil-filled isolated volumes which prevent harsh media whose pressure is being measured from coming into contact with the pressure-sensing die 101 and the electrical components (e.g. piezoresistive elements, bond wires, electrically conductive traces) of pressure sensor subassembly 100.

Figure 2A:
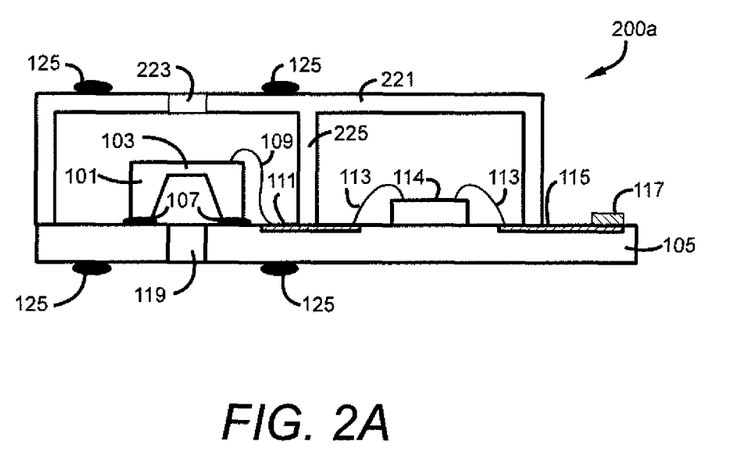
FIG. 2A is a cross-sectional view of a pressure-sensing subassembly, including an isolated volume containing circuit components, according to an embodiment of the disclosure.

FIG. 2A is a cross-sectional view of a pressure-sensing subassembly 200a, including an isolated volume containing circuit components according to an embodiment of the disclosure. Pressure-sensing subassembly 200a is configured to detect pressure using a semiconductor pressure-sensing die 101. A portion of semiconductor pressure-sensing die 101 is thinned to define a pressure-sensitive diaphragm 103. Piezoresistive elements (not shown) are arranged or formed at one or more surfaces of diaphragm 103. When a pressure is exerted on a surface of diaphragm 103, diaphragm 103 deflects and produces a strain on the piezoresistive elements. The piezoresistive elements exhibit an electrical resistance which varies with the amount of this deflection. The piezoresistive elements are electrically connected to circuitry of subassembly 200a via a bond wire 109 and an electrically conductive trace 111. The piezoresistive elements are further connected to a control circuit 114 via electrically conductive trace 111 and a bond wire 113. Control circuit 114 may be configured as an integrated circuit chip which controls and processes signals generated from the electrical circuitry including the piezoresistive elements at the surface of diaphragm 103. Control circuit 114 may provide electrical signals to circuits external to subassembly 200a via bond wire 113 connected to another electrically conductive trace 115 which is in electrical contact with output terminals via bond pads 117.

Figure 2B:
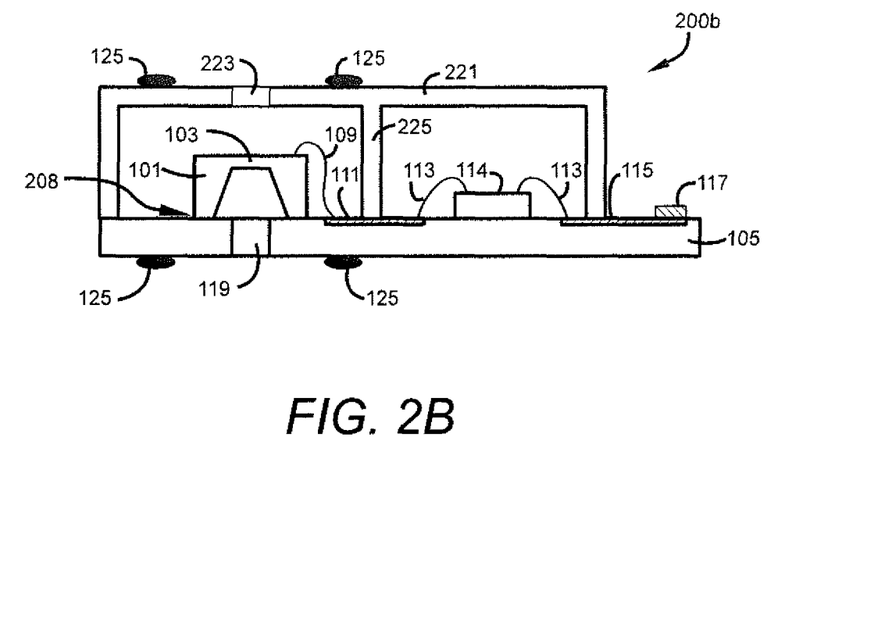
FIG. 2B is a cross-sectional view of a pressure-sensing subassembly, including a pressure-sensing die anodically bonded to the base of the subassembly, according to an embodiment of the disclosure.
Figure 2C:
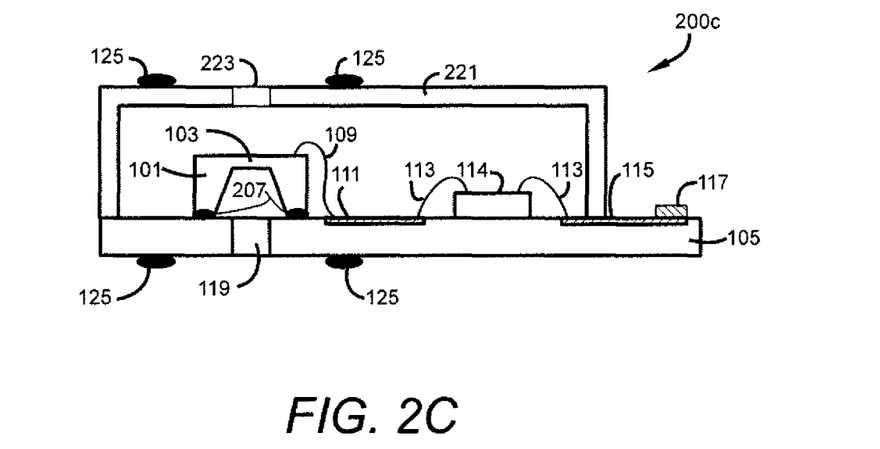
FIG. 2C is a cross-sectional view of a pressure-sensing subassembly having a housing to enclose the pressure-sensing die and the control circuitry, according to an embodiment of the disclosure.

With reference to FIG. 2A, FIG. 2B and FIG. 2C, pressure-sensing die 101 is bonded to a substrate 105 at attachment points 107 using adhesive, anodic bonding or soldering techniques as known in the art. A housing 221 is provided which covers the pressure-sensing die 101 and control circuit 114 and is attached to substrate 105 via adhesive, solder or glass frit, by way of example one. In FIG. 2A and FIG. 2B, pressure-sensing die 101 and control circuit 114 are separated by a wall 225 which provides a fluid-tight barrier between pressure-sensing die 101 and control circuit 114. This design minimizes the amount of fill volume and isolates control circuit 114 from the pressure transmitting fluid. In FIG. 2C, illustrates a housing 121 enclosing both pressure-sensing die 101 and control circuit 114 in common volume or interior space. This embodiment minimizes the size of subassembly 200c. However, during use the pressure-sensing die 101 and control circuit 114 of subassembly 200c would be submerged in a pressure-transmitting fluid. A first aperture 119 is provided through substrate 105 which allows a fluid to enter aperture 119 and come into fluid contact with a bottom surface of diaphragm 103. According to one embodiment, aperture 119 is configured to have a diameter that is substantially equal or greater to the diameter of diaphragm 103. A second aperture 223 is defined through housing 221 which allows a fluid to come into fluid communication with an upper surface of diaphragm 103. Pressure-sensing subassembly 200 may act as a differential pressure sensor wherein a first fluid at a first pressure is introduced through aperture 223 and comes into fluid communication with the upper surface of diaphragm 103, while at the same time, a second fluid at a second pressure is introduced through aperture 119 and comes in fluid communication with the lower surface of diaphragm 103. The first and second pressures are applied to opposing surfaces of diaphragm 103 and may cause a deflection of diaphragm 103 which is representative of a difference in pressure between the first pressure and the second pressure.

Pressure-sensing subassembly 200a may include a bonding agent or sealant 125 or O-ring-type seal (FIG. 3B, 126, 128), both at the upper surface of housing 221 and generally surrounding aperture 223 and at the lower surface of substrate 105 surrounding aperture 119. Sealant 125 allows pressure-sensing subassembly 200 to be inserted into and sealed with respect to a separately-fabricated sensor housing. Referring to FIG. 2B, pressure-sensing die 101 may be anodically bonded directly to substrate 105 at location 208. Sensor housing 221 may include other pressure sensor components, such as fluid ports associated with apertures 223 and 119, oil-filled isolated volumes which prevent harsh media whose pressure is being measured from coming into contact with the pressure-sensing die 101 and the electrical components (e.g. piezoresistive elements, bond wires, electrically conductive traces) of pressure-sensing subassembly 200.

Figure 3A:
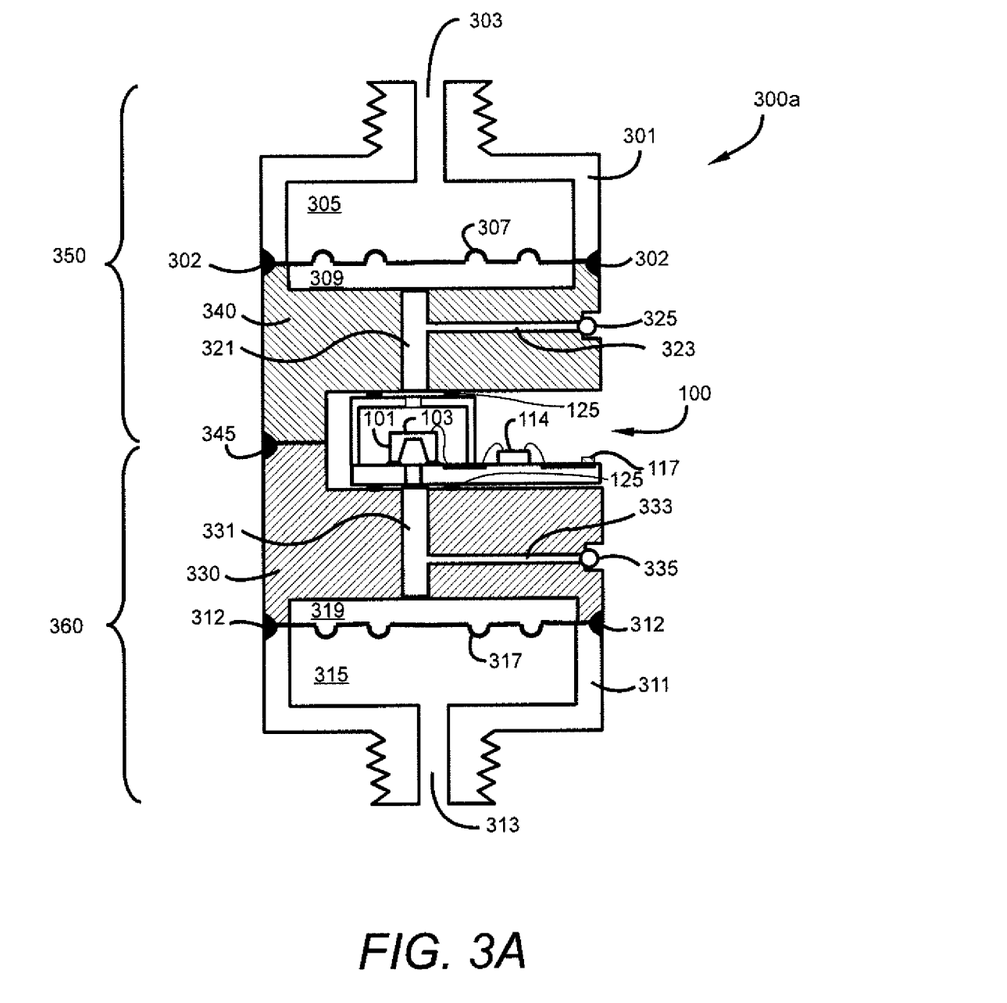
FIG. 3A is a cross-sectional view of a pressure-sensing subassembly installed in a pressure sensor package according to an embodiment of the disclosure.
Figure 3B:
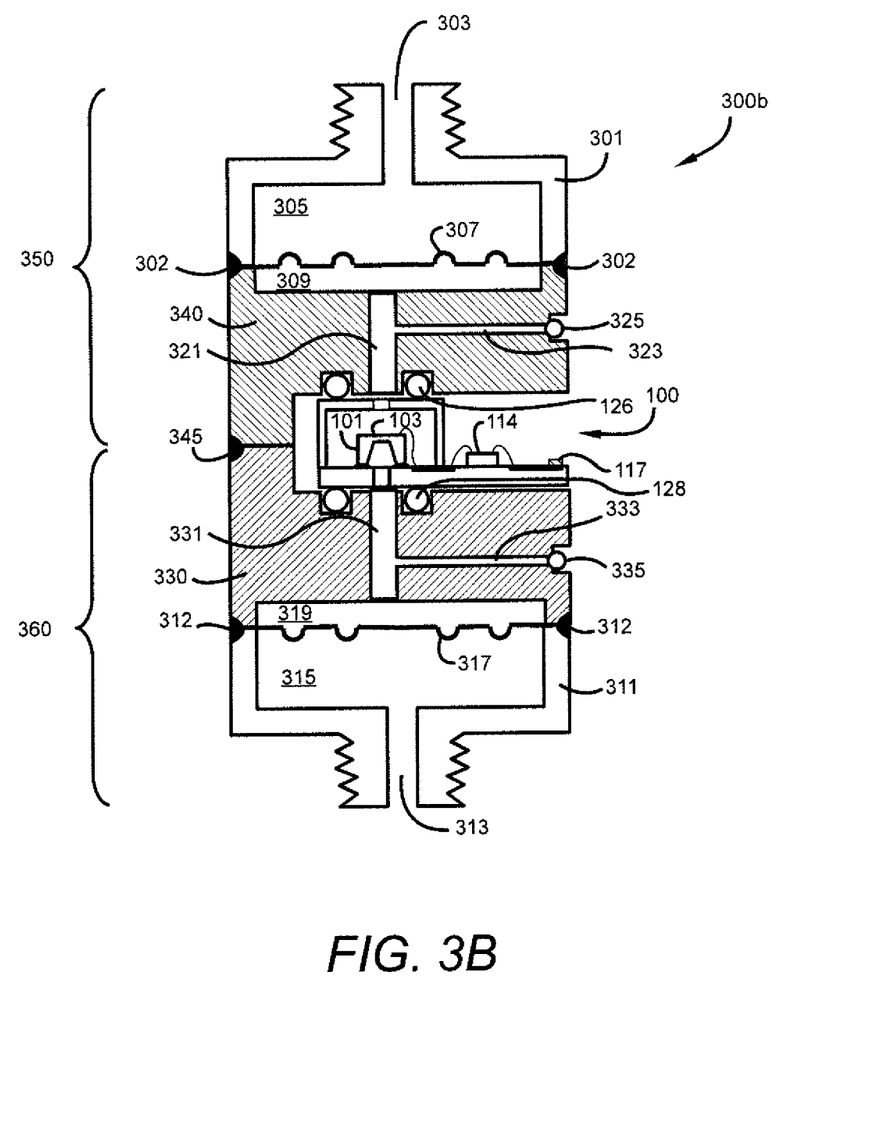
FIG. 3B is a cross-sectional view of a pressure-sensing subassembly in a pressure-sensing package having an O-ring seal between the subassembly and the package according to an embodiment of the disclosure.
Figure 3C:
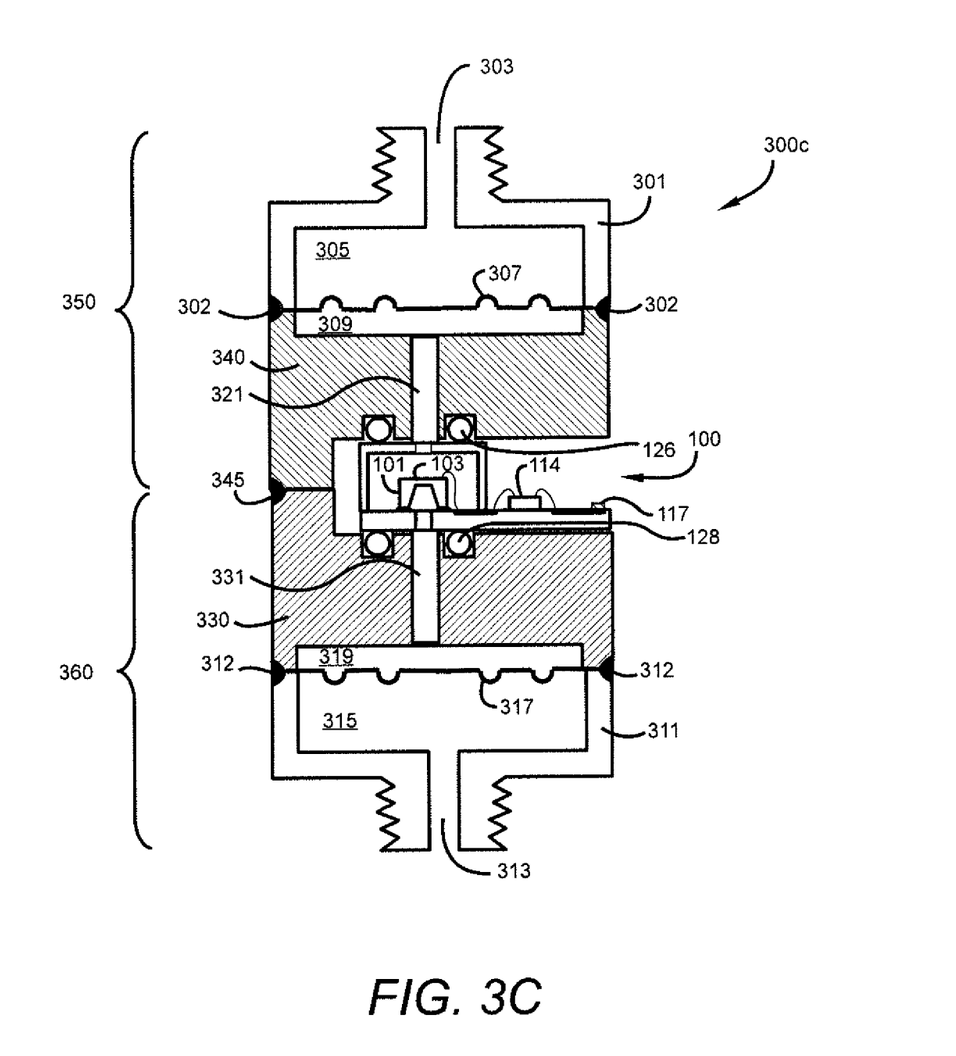
FIG. 3C is a cross-sectional view of the pressure-sensing subassembly of FIG. 3B, in which the fluid volume in the housing may be filled during assembly of the pressure sensor according to an embodiment of the disclosure.

FIG. 3A is a cross-sectional view of a differential pressure sensor 300a including a pressure sensor subassembly 100 according to an embodiment of the disclosure. Pressure sensor subassembly 100 is configured as a modular component insertable into a pressure sensor package. The pressure sensor package illustrated in FIG. 3A includes two housing members 350, 360. Pressure sensor subassembly 100 is inserted between housing member 350 and housing member 360. Pressure sensor subassembly 100 includes a semiconductor pressure-sensing die 101. Pressure-sensing die 101 is thinned at a portion of the die to form a thin pressure-sensitive diaphragm 103. Piezoresistive elements (not shown) are formed or arranged at a surface of diaphragm 103. Pressure applied to the surfaces of diaphragm 103 cause diaphragm 103 to deflect, exerting stress or strain on the piezoresistive elements. The piezoresistive elements exhibit an electrical resistance which varies with the amount of deflection of diaphragm 103. Pressure-sensing die 101 is attached to a substrate 105. Substrate 105 includes an opening or aperture defined through the substrate 105 allowing access to the underside of diaphragm 103. The aperture defined in substrate 105 may be substantially aligned with the lower surface of diaphragm 103 and may have a diameter which is substantially equal to or greater than the diameter of diaphragm 103.

A control circuit 114 is disposed on substrate 105 and performs processing of electrical signals generated by the varying resistance of the piezoresistive elements when diaphragm 103 experiences forces created by pressure applied to the surfaces of diaphragm 103. The piezoresistive elements may be electrically connected to control circuit 114 via bond wires (109, shown in FIG. 1) and electrically conductive traces (111, shown in FIG. 1) defined at or on a surface of substrate 105. Control circuit 114 may be configured as an integrated circuit chip, for example, control circuit 114 may be an ASIC. One or more bond pads 117 may provide electrical connection to circuitry external to the pressure sensor subassembly 100. Bond pads 117 are electrically connected to control circuit 114 via bond wires and electrically conductive traces (113, 115, respectively, as shown in FIG. 1). Bond pads 117 may be configured as an output terminal, including a conductive pin, blade, socket, or the like for creating an electrical connection with a complimentary electrical connector from an external circuit or system.

Pressure sensor subassembly includes a housing (121, shown in FIG. 1), which contains pressure-sensing die 101. An aperture (123, shown if FIG. 1) is defined in housing 121 and allows fluid access to the upper surface of sensitive diaphragm 103. A seal, such as sealing material 125 is disposed on the upper surface of the housing 121 and generally surrounds aperture 123. Sealing material 125 of FIG. 3A may be an adhesive, such as glue, or may comprise solder which may be used to form a fluid-tight joint between housing 121 of pressure sensor assembly 100 and a body 340 of pressure sensor upper member 350. With reference to FIG. 3B and FIG. 3C, an O-ring type seal 126, 128 may be used in place of sealant material 125 of FIG. 3A. Bond or sealing material 125 (or O-ring 128) is also applied to the lower surface of substrate 105, surrounding opening or aperture 119 defined in substrate 105. Sealing material 125 may be used to for a fluid-tight seal between the lower surface of substrate 105 of pressure sensor subassembly 100 and body 330 of pressure lower sensor member 360.

Pressure sensor upper member 350 includes an outer wall 301 which is configured to form a fluid inlet port 303. Fluid inlet port 303 may include a threaded surface, which may be connected to a threaded conduit carrying a first fluid whose pressure is to be measured by pressure sensor 300. A flexible diaphragm 307 forms a wall between outer wall 301 and body 340. The outer edges of flexible diaphragm 307 are positioned between outer wall 301 and body 340 and sealed by welds 302. Outer wall 301, body 340 and flexible diaphragm 307 comprise materials which are resistant to damage caused by exposure to harsh media which may be introduced to fluid inlet port 303. For example, outer wall 301, body 340 and flexible diaphragm 307 may comprise stainless steel.

Body 340 includes a chamber 321 extending from one end of body 340 to the other, an oil-fill tube 323 which extends from an outer surface of body 340 to chamber 321. Oil-fill tube 323 allows an oil or other fluid to be introduced into and fill chamber 321 forming an oil-filled volume 309 between flexible diaphragm 307 and body 340. The oil or fluid introduced via oil-fill tube 323 also travels through chamber 321 and enters aperture 123 defined in housing 121 of pressure sensor subassembly 100. The oil or fluid enters housing 121 and comes into fluid communication with the upper surface of semiconductor pressure-sensing die 101. Seal 125 allows the oil or fluid to enter the aperture 123 in housing 121 and provides a fluid-tight seal, maintaining the oil or fluid at pressure inside pressure sensor 300. Oil-fill tube 323 may be sealed when chamber 321 and oil-filled volume 309 are filled by a welding ball 325 or other sealing method such as crimping and the like. In the embodiment of FIG. 3C, the oil may simply be trapped inside the pressure sensor 300c by introducing the oil prior to the attachment of pressure-sensing die 101 or subassembly 200a to the housing. Thus, the embodiment of FIG. 3C omits filter tube 323 and welding ball 325. Pressure sensor 300c of FIG. 3C provides a lower cost sensor which does not require welded balls or drilled holes for introducing a transmitting fluid after fabrication. During fabrication of sensor 300c, the pressure-sensing die sub-assembly 100 is inserted between body 330 and body 340, which are mated together. Housing bodies 330, 340 are welded together, while O-rings 126 and 128 are positioned as shown to create a seal between the pressure-sensing die sub-assembly 100 and housing bodies 330, 340. Fluid-filled volumes 309, 319 may be filled with oil or other transmitting fluid and sealed by welding flexible diaphragm 307 and flexible diaphragm 317 in place against housing bodies 340 and 330, respectively. Flexible diaphragms 307, 317 may be welded in place by an appropriate connection technique such as a resistance weld, by way of example.

Pressure sensor lower member 360 is configured similarly to pressure sensor upper member 350 and includes an outer wall 311 which is configured to form a fluid inlet port 313. Fluid inlet port 313 may include a threaded surface, which may be connected to a threaded conduit carrying a second fluid whose pressure is to be measured by the pressure sensor 300. A flexible diaphragm 317 forms a wall between outer wall 311 and body 330. The outer edges of flexible diaphragm 317 are positioned between outer wall 311 and body 330 and sealed by welds 312. Outer wall 311, body 330 and flexible diaphragm 317 comprise materials which are resistant to damage caused by exposure to harsh media which may be introduced to fluid inlet port 313. For example, outer wall 311, body 330 and flexible diaphragm 317 may comprise stainless steel.

Body 330 includes a chamber 331 extending from one end of body 330 to the other, an oil-fill tube 333 which extends from an outer surface of body 330 to chamber 331. Oil-fill tube 333 allows an oil or other fluid to be introduced into and to fill chamber 331 forming an oil-filled volume 319 between flexible diaphragm 317 and body 330. The oil or fluid introduced via oil-fill tube 333 also travels through chamber 331 and enters aperture 119 defined in substrate 105 of pressure sensor subassembly 100. The oil or fluid enters aperture 119 and comes into fluid communication with the lower surface of sensitive diaphragm 103 of semiconductor pressure-sensing die 101. Seal 125 allows the oil or fluid to enter aperture 119 in substrate 105 and provides a fluid-tight seal, maintaining the oil or fluid at pressure inside pressure sensor 300. Oil-fill tube 333 may be sealed once chamber 331 and oil-filled volume 319 are filled by a welding ball 335 or other sealing method such as crimping and the like. In the embodiment of FIG. 3C, the oil may simply be trapped inside the pressure sensor 300c by introducing the oil prior to attachment of the pressure-sensing die 101 or the subassembly 200a attachment to the housing. Thus, the embodiment of FIG. 3C omits filter tube 333 and welding ball 335.

Figure 3D:
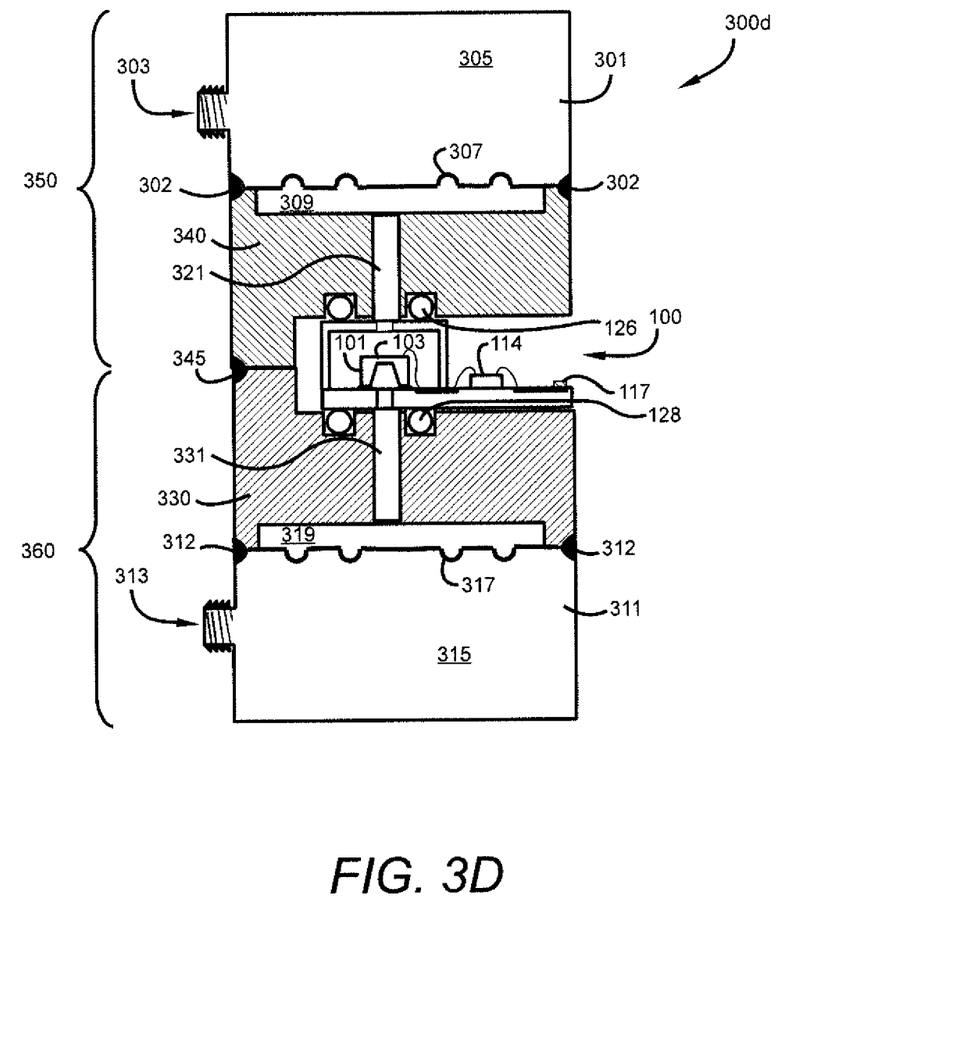
FIG. 3D is a cross-sectional view of a pressure-sensing subassembly in which the fluid ports are configured to receive input fluids at differential pressures from one side of the pressure sensor according to an embodiment of the disclosure.

Referring to FIG. 3D, a differential pressure sensor 300d is shown, in which fluid inlet port 303 and fluid inlet port 313 are arranged such that input fluids at differential pressures may be introduced to differential pressure sensor 300d from one side of the sensor. Differential pressure sensor 300d provides simple access to both fluid inlet port 303 for receiving a first fluid at a first pressure, and second fluid inlet port 313 for receiving a second fluid at a second pressure. Differential pressure sensor 300d may be flush mounted and easily connected to a pair of fluid inputs. By way of non-limiting example, differential pressure sensor 300d may be flush mounted to an engine manifold. Differential pressure sensor 300d may measure a difference in pressure between the input and the output of a valve, such as an emission gas recirculation (EGR) valve. The pressure at the input of the EGR valve may be introduced to fluid input port 303, while the pressure at the output of the EGR valve may be introduced to fluid input port 313. Differential pressure sensor 300d will thereby measure a differential pressure across the EGR valve. The measured value of the differential pressure across the valve may be transmitted to control circuity providing master control of an engine's systems. The location of fluid input port 303 and fluid input port 313 allow for easy attachment of the fluid inputs, through a modular plug or the like, which is attached to hoses leading from the ends of the EGR valve. Other components, such as valves, vacuum sensors, filters and the like may also be adapted for connection to differential pressure sensor 300d.

Pressure sensor upper member 350 and pressure sensor lower member 360 may be mated together with subassembly 100 positioned therebetween. A joint formed between pressure sensor upper member 350 and pressure sensor lower member 360 is sealed by a weld 345. Pressure sensor lower member 360 may be sealed from the lower surface of substrate 105 by sealing material 125 or O-ring 128. Pressure sensor upper member 350 may be bonded to housing 121 of pressure sensor subassembly 100 by sealing material 125 or O-ring 126. The resulting structure defines differential pressure sensor 300a, 300b, 300c, 300d which includes the pressure sensor housing comprising upper member 350 and lower member 360 which accommodate modular pressure sensor subassembly 100.

Referring now to FIG. 3A differential pressure sensors according to embodiments of the present disclosure operate by attaching a first fluid source at a first pressure to fluid inlet port 303 and a second fluid source at a second pressure to fluid inlet port 313. First fluid source introduces a fluid, which may be a gas, at the first pressure via fluid inlet port 303 to fill volume 305. Volume 305 includes flexible diaphragm 307 as one of its walls. Therefore, the first fluid comes into contact with flexible diaphragm 307. First fluid is at a first pressure which exerts a force on flexible diaphragm 307. The force causes flexible diaphragm 307 to deflect and exert a force on the oil or fluid in oil-filled volume 309. Force is transmitted undiminished through the oil or fluid in oil-filled volume 309, through chamber 321 and onto the upper surface of diaphragm 103 of semiconductor pressure-sensing die 101.

Second fluid source introduces a fluid, which may be a gas, at the second pressure via fluid inlet port 313 to fill volume 315. Volume 315 includes flexible diaphragm 317 as one of its walls. Therefore, the second fluid comes into contact with flexible diaphragm 317. Second fluid is at a second pressure which exerts a force on flexible diaphragm 317. The force causes flexible diaphragm 317 to deflect and exert a force on the oil or fluid in oil-filled volume 319. Force is transmitted undiminished through the oil or fluid in oil-filled volume 319, through chamber 331 and onto the lower surface of diaphragm 103 of semiconductor pressure-sensing die 101.

Thus, the first fluid at a first pressure is applied to the upper surface of sensitive diaphragm 103 while the second fluid at a second pressure is simultaneously applied to the lower surface of sensitive diaphragm 103. The differential pressure between the first pressure and the second pressure determines the amount of deflection of diaphragm 103, and as a result, the resistance value of the piezoresistive elements formed at or on the surface of diaphragm 103. Control circuit 114 is configured to produce an electrical signal that varies with the resistance value of the piezoresistive elements. Control circuit 114 may include a processor for processing an electrical signal produced by the resistance value of the piezoresistive elements to produce an output signal which is electrically communicated to bond pads 117. The processed electrical signal contains information representative of the differential pressure applied to the upper and lower surfaces of diaphragm 103.

Figure 4:
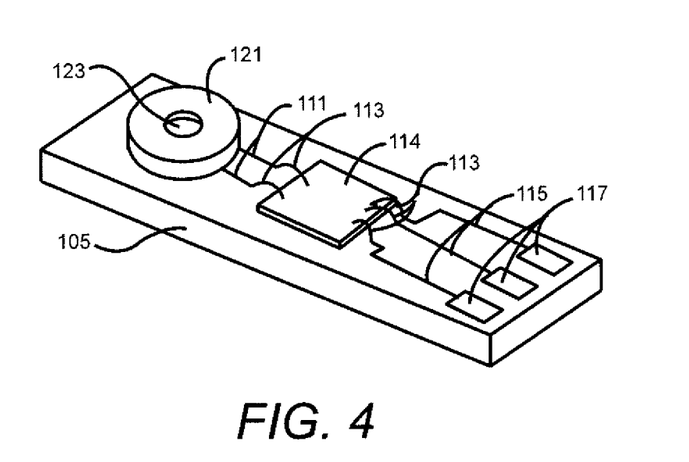
FIG. 4 is an isometric view of the pressure-sensing subassembly of FIG. 1.

FIG. 4 is an isometric view of the pressure-sensing subassembly of FIG. 1. Substrate 105 may be a ceramic substrate, a printed circuit board or other suitable material. Substrate 105 supports a semiconductor pressure-sensing die (101, shown in FIG. 1) which is enclosed by a housing 121. Housing 121 has an aperture 123 defined therethrough for providing fluid communication between a fluid under test and the upper surface of a sensitive diaphragm (103, FIG. 1) of pressure-sensing die 101. Housing 121 is configured as a circular or cylindrical volume which surrounds the pressure-sensing die 101. Piezoresistive elements defined at the surface of diaphragm 103 are connected to electrically conductive traces 111 which are disposed at the surface of substrate 105. A control circuit 114, which may be configured as an ASIC, is connected to electrically conductive traces 111 and 115 by bond wires 113. Electrically conductive traces 115 are electrically connected to bond pads 117 which may be electrically connected to other circuitry external to pressure-sensing subassembly 100.

Figure 5:
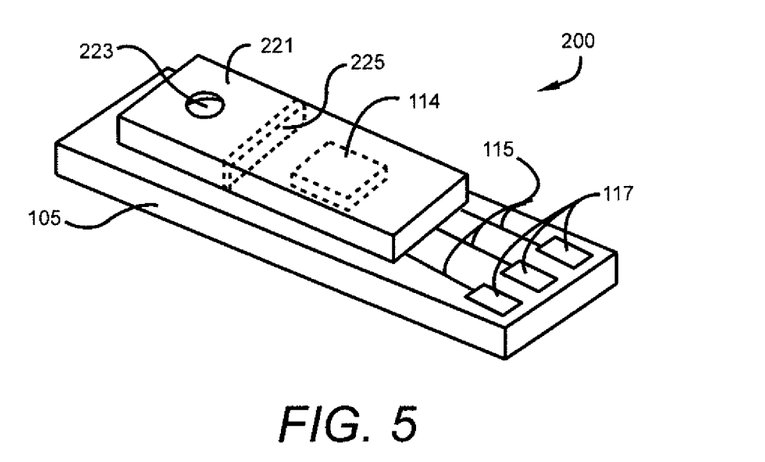
FIG. 5 is an isometric view of the pressure-sensing subassembly including an isolated volume containing circuit components of FIG. 2.

FIG. 5 is an isometric view of the pressure-sensing subassembly including an isolated volume containing circuit components of FIG. 2. Substrate 105 may be a ceramic substrate, a printed circuit board or other suitable material. Substrate 105 supports a semiconductor pressure-sensing die (101, shown in FIG. 2) which is enclosed by a housing 221. Housing 221 has an aperture 223 defined therethrough for providing fluid communication between a fluid under test and the upper surface of a sensitive diaphragm (103, FIG. 2) of pressure-sensing die 101. Housing 221 is configured as a rectangular volume which surrounds the pressure-sensing die 101 and control circuit 114. A dividing wall 225 separates pressure-sensing die 101 from control circuit 114. Piezoresistive elements defined at the surface of diaphragm 103 are connected to electrically conductive traces which are disposed at the surface of substrate 105. A control circuit 114, which may be configured as an ASIC, is connected to electrically conductive traces 115. Electrically conductive traces 115 are electrically connected to bond pads 117 which may be electrically connected to other circuitry external to pressure-sensing subassembly 200.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A differential pressure sensor comprising:
   a first sensor housing member having a first fluid inlet port for receiving a first fluid at a first pressure:
   a second sensor housing member having a second fluid inlet port for receiving a second fluid at a second pressure; and
   a separately-fabricated pressure-sensing subassembly having a substrate on which is attached a semiconductor pressure-sensing die including a sensitive diaphragm having at least one piezoresistive element and a control circuit in electrical communication with the piezoresistive element, the pressure-sensing subassembly configured to be inserted into the differential pressure sensor such that once inserted the first fluid inlet port of the first sensor housing member is in fluid communication with a first surface of the sensitive diaphragm and the second fluid inlet port of the second sensor housing member is in fluid communication with a second surface of the sensitive diaphragm.

2. The differential pressure sensor of claim 1, wherein the substrate has a first aperture defined through the substrate, wherein the semiconductor pressure-sensing die is attached to the substrate such that a lower surface of the sensitive diaphragm is substantially aligned with the first aperture in the substrate;
   and further comprising a housing attached to the substrate, the housing containing the semiconductor pressure-sensing die and having a second aperture defined therethrough for providing fluid communication with an upper surface of the sensitive diaphragm.

3. The differential pressure sensor of claim 2, wherein the pressure-sensing subassembly further comprises sealing material disposed on a surface of the housing surrounding the second aperture and on a lower surface of the substrate surrounding the first aperture, wherein the sealing material provides a fluid-tight seal between the housing and the first sensor housing member and between the lower surface of the substrate and the second sensor housing member.

4. The differential pressure sensor of claim 3, wherein the sealing material is an adhesive.

5. The differential pressure sensor of claim 3, wherein the sealing material is a solder.

6. The differential pressure sensor of claim 3, wherein the sealing material is an elastomer or rubber such as an O-ring seal.

7. The differential pressure sensor of claim 2, wherein the at least one piezoresistive element is formed on at least one of the lower surface and the upper surface of the sensitive diaphragm; and
   the control circuit is attached to the substrate.

8. The differential pressure sensor of claim 7, wherein the control circuit is configured as an Application Specific Integrated Circuit.

9. The differential pressure sensor of claim 1, wherein the first sensor housing member having the first fluid inlet port further comprises:
   an outer wall defining the first fluid inlet port and further defining a first volume for receiving the first fluid at the first pressure;
   a first flexible diaphragm defining a wall of the first volume for receiving the first fluid at the first pressure; and
   a first body containing a first chamber, the first flexible diaphragm being positioned between the outer wall defining the first fluid inlet port and the first body, wherein a second volume is defined between the first flexible diaphragm and the first chamber, the second volume configured to be filled with an oil or fluid which will not cause damage to the semiconductor pressure-sensing die.

10. The differential pressure sensor of claim 9, wherein the second sensor housing member having the second fluid inlet port further comprises:
    an outer wall defining the second fluid inlet port and further defining a third volume for receiving the second fluid at the second pressure;
    a second flexible diaphragm defining a wall of the third volume for receiving the second fluid at the second pressure; and
    a second body containing a second chamber, the second flexible diaphragm being positioned between the outer wall defining the second fluid inlet port and the second body, wherein a fourth volume is defined between the second flexible diaphragm and the second chamber, the fourth volume configured to be filled with an oil or fluid which will not cause damage to the semiconductor pressure-sensing die.

11. The differential pressure sensor of claim 10, wherein the outer walls defining the first and second fluid inlet ports, the first and second flexible diaphragms, and the first and second bodies comprise a material that is resistant to damage from a harsh medium.

12. The differential pressure sensor of claim 11, wherein the outer walls defining the first and second fluid inlet ports, the first and second flexible diaphragms, and the first and second bodies comprise stainless steel.

13. A pressure-sensing subassembly comprising:
a substrate;
a semiconductor pressure-sensing die including a sensitive diaphragm supported by the substrate, the substrate including a first aperture substantially aligned with the sensitive diaphragm;
at least one piezoresistive element defined at a surface of the sensitive diaphragm;
an electrically conductive trace defined on at least one of the surface or in layers below the surface of the substrate, the electrically conductive trace being electrically connected to the at least one piezoresistive element via at least one bond wire;
a control circuit disposed on the substrate and electrically connected to the electrically conductive trace;
at least one bond pad disposed on the substrate and electrically connected to the control circuit;
a housing attached to the substrate and surrounding the pressure-sensing die, the housing having a second aperture defined therein, the second aperture substantially aligned with an upper surface of the sensitive diaphragm;
a first seal on an exterior upper surface of the housing, said first seal surrounding the second aperture; and
a second seal on an exterior lower surface of the substrate, said second seal surrounding the first aperture.

14. The pressure-sensing subassembly of claim 13, wherein the substrate comprises a glass substrate.

15. The pressure-sensing subassembly of claim 13, wherein the first seal and the second seal comprise an adhesive.

16. The pressure-sensing subassembly of claim 13, wherein the first seal and the second seal comprise a solder.

17. The pressure-sensing subassembly of claim 13, wherein the first seal and the second seal comprise an elastomer seal.

18. The pressure-sensing subassembly of claim 13, wherein the pressure-sensing subassembly is configured as a modular component configured to be inserted into a differential pressure sensor package.

19. The pressure-sensing subassembly of claim 13, comprising at least one electrically conductive output pin electrically connected to the at least one bond pad for external electrical connection to the pressure-sensing subassembly.

20. The pressure-sensing subassembly of claim 13, wherein the housing is further configured to surround the control circuit, and comprises a separating wall between the semiconductor pressure-sensing die and the control circuit.

* * * * *